United States Patent
Czaplik et al.

(10) Patent No.: US 10,563,066 B2
(45) Date of Patent: Feb. 18, 2020

(54) RED IRON-OXIDE PIGMENTS WITH IMPROVED COLOUR VALUES

(71) Applicant: LANXESS DEUTSCHLAND GMBH, Cologne (DE)

(72) Inventors: Waldemar Czaplik, Krefeld (DE); Jurgen Kischkewitz, Ratingen (DE); Stephan Spiegelhauer, Langenfeld (DE)

(73) Assignee: LANXESS Deutschland GmbH, Cologne (DE)

( * ) Notice: Subject to any disclaimer, the term of this patent is extended or adjusted under 35 U.S.C. 154(b) by 235 days.

(21) Appl. No.: 15/510,312

(22) PCT Filed: Sep. 10, 2015

(86) PCT No.: PCT/EP2015/070745
§ 371 (c)(1),
(2) Date: Mar. 10, 2017

(87) PCT Pub. No.: WO2016/038152
PCT Pub. Date: Mar. 17, 2016

(65) Prior Publication Data
US 2017/0253745 A1    Sep. 7, 2017

(30) Foreign Application Priority Data
Sep. 11, 2014   (EP) .................................. 14184507

(51) Int. Cl.
*C09C 1/24* (2006.01)
*C09D 7/61* (2018.01)
(Continued)

(52) U.S. Cl.
CPC ................ *C09C 1/24* (2013.01); *C01G 49/06* (2013.01); *C09D 7/61* (2018.01); *C01P 2004/62* (2013.01);
(Continued)

(58) Field of Classification Search
None
See application file for complete search history.

(56) References Cited

U.S. PATENT DOCUMENTS

| | | | |
|---|---|---|---|
| 1,327,061 A | 1/1920 | Penniman et al. | |
| 1,368,748 A | 2/1921 | Penniman et al. | |

(Continued)

FOREIGN PATENT DOCUMENTS

| | | | |
|---|---|---|---|
| CN | 1054088 A | 8/1991 | |
| CN | 19981012321 A | 7/1999 | |

(Continued)

OTHER PUBLICATIONS

Excalibar Minerals LLC. Product Information: Hematite (Sep. 26, 2016).*

(Continued)

*Primary Examiner* — Colleen P Dunn
*Assistant Examiner* — Ross J Christie

(57) ABSTRACT

The present invention relates to iron oxide red pigments having improved color values, a process for producing these improved iron oxide red pigments by the Penniman red process using nitrate (also referred to as nitrate process or direct red process) and an apparatus for the production thereof.

19 Claims, 3 Drawing Sheets

Figure 1:
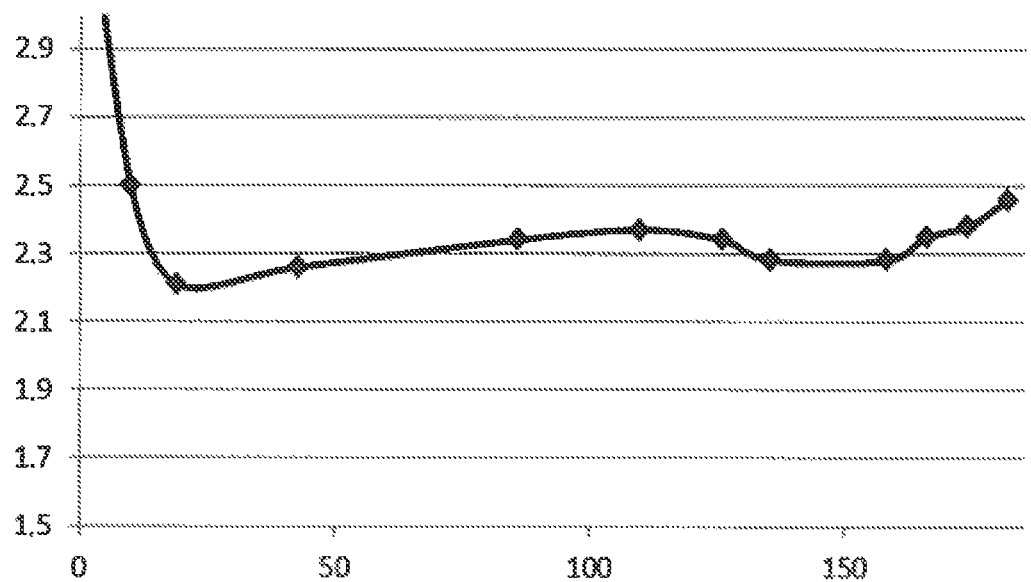

(51) Int. Cl.
*C01G 49/06* (2006.01)
*C09D 7/00* (2018.01)
*C09D 1/00* (2006.01)
*C08K 3/22* (2006.01)
*C08K 3/013* (2018.01)

(52) U.S. Cl.
CPC ...... *C01P 2004/64* (2013.01); *C01P 2004/80* (2013.01); *C01P 2004/84* (2013.01); *C01P 2006/12* (2013.01); *C01P 2006/22* (2013.01); *C01P 2006/63* (2013.01); *C01P 2006/82* (2013.01)

(56) References Cited

U.S. PATENT DOCUMENTS

| | | | |
|---|---|---|---|
| 2,937,927 A | 5/1960 | Ayers | |
| 3,946,103 A * | 3/1976 | Hund | C09C 1/24 423/633 |
| 4,753,680 A | 6/1988 | Burow et al. | |
| 5,421,878 A | 6/1995 | Lerch et al. | |
| 6,056,928 A | 5/2000 | Fetzer et al. | |
| 6,179,908 B1 * | 1/2001 | Braun | C01G 49/06 106/456 |
| 6,503,315 B1 | 1/2003 | Etzenbach et al. | |
| 6,616,747 B2 | 9/2003 | Sumita | |
| 6,627,293 B1 * | 9/2003 | Inoue | G11B 5/738 428/141 |
| 7,144,455 B2 | 12/2006 | Meisen et al. | |
| 7,294,191 B2 | 11/2007 | Rosenhahn et al. | |
| 7,604,793 B2 | 10/2009 | Koningen et al. | |
| 8,206,681 B2 | 6/2012 | Garetto | |
| 8,574,450 B2 | 11/2013 | Conca et al. | |
| 9,428,402 B2 | 8/2016 | Ketteler et al. | |
| 2003/0051636 A1 * | 3/2003 | Sumita | B82Y 30/00 106/456 |
| 2003/0170163 A1 | 9/2003 | Banerjee et al. | |
| 2005/0274284 A1 | 12/2005 | Rosenhahn et al. | |
| 2011/0076224 A1 * | 3/2011 | Garetto | C01G 49/02 423/633 |
| 2016/0272836 A1 | 9/2016 | Czaplik et al. | |
| 2017/0043626 A1 | 2/2017 | Bucher et al. | |
| 2017/0253745 A1 | 9/2017 | Czaplik et al. | |
| 2017/0267544 A1 | 9/2017 | Czaplik et al. | |
| 2017/0292024 A1 | 10/2017 | Czaplik et al. | |

FOREIGN PATENT DOCUMENTS

| | | | |
|---|---|---|---|
| CN | 1699477 A | 11/2005 | |
| EP | 0059248 A1 | 9/1982 | |
| EP | 0645437 B1 | 3/1997 | |
| JP | 6320367 A2 | 1/1988 | |
| JP | 2013193939 A2 | 9/2013 | |
| KR | 20090104327 A | 10/2009 | |
| RU | 2047556 C1 | 11/1995 | |
| SU | 1458368 A1 | 2/1989 | |
| WO | WO-2010002059 A1 * | 1/2010 | ............. C01G 49/06 |

OTHER PUBLICATIONS

Bodycomb, Jeffrey et al. "Introduction to Surface Area Analysis" HORIBA Scientific (www.horiba.com/us/particle) (2014).*
Application Bulletin Deionized Water. Myron L Company Water Quality Instrumentation. Jul. 16, 2019.*
Technical Data Sheet for Copperas Red Iron Oxides. Huntsman Pigments. (Sep. 2015).*
Shen, Qing, et al., "Preparation of crystal seeds of iron oxide red by nitric acid method and its effect on oxidation", Wujiyan Gongye (1997), (6), 5-6, Wujiyan Gonge Bianjib, four pages*.
Ullmann's Encyclopedia of Industrial Chemistry, Inorganic Pigments, Chapter 3.1.1, Iron Oxide Pigments, pp. 61-67.
European Search Report from European Application No. 15763878.4, dated Jan. 23, 2018, one page.
European Search Report from corresponding European Application No. 14184507, dated Feb. 19, 2015, two pages.
Colombian Search Report from corresponding Colombian Application No. 2017/NC0002374, one page.
Japanese Search Report from corresponding Japanese Application No. 2017-513773, dated Feb. 19, 2018, 5 pages.
Chinese Search Report from Chinese Application No. 201580048472.7, dated Sep. 29, 2017, one page.
Russian Search Report from corresponding Russian Application No. 2017112052/05, dated Mar. 15, 2019, two pages.

* cited by examiner

RED IRON-OXIDE PIGMENTS WITH IMPROVED COLOUR VALUES

The present invention relates to iron oxide red pigments having improved color values, a process for producing these improved iron oxide red pigments by the Penniman red process using nitrate (also referred to as nitrate process or direct red process) and an apparatus for the production thereof.

Iron oxides are employed in many industrial fields. Thus, for example, they are used as color pigments in ceramics, building materials, plastics, paints, surface coatings and paper, serve as basis for various catalysts or support materials and can adsorb or absorb pollutants. Magnetic iron oxides are employed in magnetic recording media, toners, ferrofluids or in medical applications, for example as contrast agent for magnetic resonance tomography.

Iron oxides can be obtained by precipitation, hydrolysis and decomposition reactions of iron salts (Ullmann's Encyclopedia of Industrial Chemistry, VCH Weinheim 2006, Chapter 3.1.1. Iron Oxide Pigments, pp. 61-67). The Laux, Copperas, precipitation, calcination and Penniman red processes have by far the greatest industrial importance.

The aqueous production of finely divided hematite, which corresponds to the modification $\alpha$-$Fe_2O_3$, is, however, considerably more complicated. Use of a ripening step and addition of a finely divided iron oxide of the maghemite modification, $\gamma$-$Fe_2O_3$, or lepidocrocite, $\gamma$-FeOOH, as nucleus enables hematite also to be produced by a direct aqueous precipitation [U.S. Pat. No. 5,421,878; EP0645437A; WO 2009/100767A].

A further method of producing iron oxide red pigments is the Penniman red process, also referred to as nitrate process or direct red process (U.S. Pat. Nos. 1,327,061; 1,368,748; 2,937,927; EP 1106577A; U.S. Pat. No. 6,503,315). Here, iron oxide pigments are produced by iron metal being dissolved and oxidized with addition of an iron salt and an iron oxide nucleus. Thus, SHEN, Qing; SUN, Fengzhi; Wujiyan Gongye 1997, (6), 5-8 (CH), Wujiyan Gongye Blanjlb, (CA 128:218378n) have disclosed a process in which dilute nitric acid acts on iron at elevated temperature. This forms a hematite nucleus suspension. This is built up in a manner known per se to give a suspension of red pigment and the pigment is, if desired, isolated from this suspension in a conventional manner.

However, the red pigments produced by this process have a comparatively low color saturation which is similar to the color saturation of a commercial 130 standard and are therefore primarily used in the building industry. The 130 standard corresponds to the reference standard Bayferrox® 130 (product of LANXESS Deutschland GmbH, Germany) customarily used for iron oxide pigment color measurements.

EP 1106577A discloses a variant of the Penniman red process which comprises dilute nitric acid acting on iron at elevated temperature to produce nuclei, i.e. finely divided iron oxides having a particle size of less than or equal to 100 nm. The reaction of iron with nitric acid is a complex reaction and can lead either to passivation of the iron and thus cessation of the reaction or to dissolution of the iron to form dissolved iron nitrate depending on the experimental conditions. Both reaction paths are undesirable and the production of finely divided hematite is thus successful only under limited experimental conditions. EP 1106577A describes such conditions for producing finely divided hematite. Here, the iron is reacted with dilute nitric acid at temperatures in the range from 90 to 99° C.

WO 2013/045608 describes a process for producing iron oxide red pigments, in which the reaction step of production of the nuclei, i.e. of finely divided hematite having a particle size of less than or equal to 100 nm, has been improved.

In the nitrate process according to the prior art, iron or a mixture of iron and water is usually initially charged. The hematite nucleus suspension is then usually added to at least iron, and iron (II) nitrate solution is subsequently added to the mixture. The reaction usually commences after the temperature of the reaction mixture has been increased, typically to from 70 to 99° C., and after introduction of an oxygen-containing gas has been commenced.

To measure the color intensity of iron oxide red pigments, there are long-established test methods in which the color of media such as concrete test specimens or surface coating systems which have been colored with the iron oxide red pigment is measured. The parameters of the CIELAB color space have become established as standard parameters for measuring the color of iron oxide red pigments in a surface coating system. The basic methods therefor are set down in the standard DIN EN ISO 11664-4 "Colorimetry—Part 4: CIE 1976 L*a*b* color space" (Beuth publishers, 2011-07 edition). Each perceptible color in this three-dimensional color space is defined by the color location having the coordinates L* (lightness), a* (red-green value) and b* (yellow-blue value). In accordance with the countercolor theory, green and red are here opposite one another on the a* axis and the colors yellow-blue are opposite one another on the b* axis. The more positive an a* value, the more strongly is the color red pronounced. The color green, on the other hand, is more strongly pronounced, the more negative the a* value. On the b* axis perpendicular to the a* axis, the situation is analogous with the countercolors yellow-blue. The more positive a b* value, the more strongly pronounced is the color yellow. The color blue, on the other hand, is more strongly pronounced, the more negative the b* value. The L* axis is perpendicular to the plane formed by the coordinates a* and b* and indicates the lightness. The L* axis is also referred to as neutral gray axis. It encompasses the end points black (L=0) and white (L=100). Apart from these parameters, the color saturation C* (also referred to as chroma, chromaticity or color intensity) is also often reported. This value is derived directly from the values a* and b* and is the square root of the sum of the squares of a* and b*. a*, b*, L* and C* are dimensionless values. However, the dimension CIELAB units is customarily used in this context.

In the color measurement of iron oxide red pigments, the measurement in a test in a thixotropicized long-oil alkyd resin (in accordance with DIN EN ISO 11664-4:2011-07 and DIN EN ISO 787-25:2007, as a modification thereof, a long-oil alkyd resin having an oil content of 64% by weight instead of 63% by weight and a different thixotrope is used. Details are given in the section Examples and Methods) has been found to be particularly informative. This test will, according to the invention, also be referred to as surface coating testing. The alkyd resin has the advantage that it does not dry. Measurements can therefore be carried out more quickly than when the paste firstly has to be dried before the measurement. Further details on this test method are given in the section Examples and Methods. This test is also used for specifying industrially produced red pigments, for example those from LANXESS Deutschland GmbH. Here, as is customary in the pigment industry, not only the absolute values a*, b* and L* but also the difference values Δa*, Δb* and ΔL* are reported. These difference values are determined by comparison of the values for the sample to be measured with a reference standard and represent the difference value (sample) minus value (reference). The reference standards themselves are again compared with one another and bear unique batch numbers, so that not only a comparison of the absolute values a*, b* and L* but also always a direct comparison between samples and reference standards of different generations is possible even when the original reference sample is no longer available. A further parameter for the comparative measurement is the color difference ΔE*. This is determined from the difference values Δa*, Δb* and ΔL* and is the square root of the sum of the squares of Δa*, Δb* and ΔL*.

There are two variants for carrying out the surface coating testing, namely measurement in full shade and with reduction. In the full shade measurement, the pigment is dispersed in a clear paste under standard conditions defined in the standard. The color values of the pigmented color paste are then determined. In the measurement with reduction, titanium dioxide in the rutile modification is added to the paste, so that a ratio of pigment to titanium dioxide of 1:5 is achieved. The reduction makes it possible to evaluate the color strength and color purity of a pigment even in the presence of a white pigment which lightens the color.

Particularly color-pure iron oxide red pigments for the surface coatings industry having an a* value in full shade of from 29 to 30.5 CIELAB units can be produced by the Copperas, precipitation and Penniman red processes. In full shade in surface coating testing, these are distinguished by the particular red and yellow cast and the color saturation C* is up to 40.0 CIELAB units. With reduction, i.e. In the above-described mixture with titanium dioxide, however, they display a significant decrease in the red cast, i.e. lower a* values. However, from a use point of view, it would be particularly advantageous to have available iron oxide red pigments which have a very strong red cast both in full shade and with reduction as mixture with titanium dioxide. As particularly well-suited parameter for describing the behavior of the red cast in full shade and reduction, the sum of the a* values from full shade and reduction is therefore defined. If various commercially available products are compared in respect of this parameter, it is found that the sum of a*(full shade) and a*(reduction) is significantly below 58.0 CIELAB units.

Table 1 below reports the color values in surface coating testing in full shade and with reduction of various commercially available pigments.

TABLE 1

Color values of iron oxide red pigments according to the prior art

| Iron oxide | a* full shade | b* full shade | C* full shade | a* reduction | b* reduction | C* reduction | Sum of a* full shade + a* reduction |
|---|---|---|---|---|---|---|---|
| R1599D[1] | 30.5 | 24.8 | 39.3 | 27.2 | 18.8 | 33.1 | 57.7 |
| R1299D[1] | 30.3 | 24.9 | 39.2 | 27.4 | 20.1 | 34.0 | 57.7 |
| SILO208[2] | 29.7 | 23.8 | 38.0 | 26.1 | 17.4 | 31.4 | 55.8 |
| Bayferrox® 105[3] | 29.5 | 24.5 | 38.4 | 25.9 | 18.1 | 31.6 | 55.4 |
| Bayferrox®110[3] | 28.4 | 23.0 | 36.6 | 25.6 | 17.8 | 31.2 | 54.0 |
| Penniman Red 808[4] | 29.3 | 25.2 | 38.7 | 28.2 | 24.7 | 37.5 | 57.5 |
| Penniman Red NS110[4] | 29.7 | 24.5 | 38.5 | 27.2 | 21.2 | 34.4 | 56.9 |
| Pigment analogous to examples 3 and 4 of DE4235947A[5] | 30.0 | 25.2 | 39.2 | 27.1 | 20.2 | 33.8 | 57.1 |
| Pigment analogous to examples 3 and 4[5] of DE4235947A[5] | 28.8 | 26.4 | 39.1 | 27.8 | 25.7 | 37.9 | 56.6 |

[1]Copperas ® pigment from Rockwood Pigments NA, Inc, produced by the Copperas ® process
[2]Ferroxide ™ pigment from Rockwood Pigments NA, Inc., produced by the precipitation process
[3]Pigments from LANXESS Deutschland GmbH, produced by the Laux process via a calcination step.
[4]Pigments from Yixing Yuxing Industry and Trading Company, produced by the Penniman red process,
[5]Pigments produced by the precipitation process. The examples were produced in a manner analogous to examples 3 and 4 of DE 4235947A and the color values thereof were measured in surface coating testing in full shade and with reduction.

A further requirement for iron oxide red pigments is a very low content of soluble chloride. A very low chloride content is desirable for use of iron oxide red pigments in steel-reinforced concrete (category 2, EN12878) because of the corrosion caused by chloride. The European standard DIN EN12878 prescribes a maximum chloride concentration of 0.1% by weight in the pigment. The chloride content is determined by ion chromatography.

It was therefore an object of the present invention to provide iron oxide red pigments of which smaller amounts are necessary for coloring media such as concrete, plastics, paints and varnishes than is the case for pigments of the prior art in order to achieve the same red shade, or by means of which a more intense color shade is achieved than when coloration is carried out using an equal amount thereof as of a pigment according to the prior art, with this property being present both in the case of intensive coloration of the medium and also with weaker coloration by dilution with lighter pigments such as white pigments. In addition, it was an object to provide a simple process for producing such pigments.

The invention provides iron oxide red pigments whose sum of the a* values in full shade and with reduction in surface coating testing (for precise description of the surface coating testing, see Examples and Methods) is at least 58.0 CIELAB units, preferably more than 58.5 CIELAB units, particularly preferably more than 59.0 CIELAB units, a process for the production thereof and also the use thereof for coloring concrete, plastics, paints and varnishes.

A further embodiment comprises iron oxide red pigments whose sum of the a* values in full shade and with reduction in surface coating testing is from 58.0 to 61.0 CIELAB units, preferably from 58.0 to 60.0 CIELAB units, more preferably from 58.5 to 61.0 CIELAB units, more preferably from 58.5 to 60.0 CIELAB units, particularly preferably from 59.0 to 61.0 CIELAB units, more particularly preferably from 59.0 to 80.0 CIELAB units.

A further embodiment comprises the pigments according to the invention whose sum of the a* values in full shade and with reduction in surface coating testing is from 58.0 to 61.0 CIELAB units, preferably from 58.0 to 60.0 CIELAB units, more preferably from 58.5 to 51.0 CIELAB units, more preferably from 58.5 to 60.0 CIELAB units, particularly preferably from 59.0 to 61.0 CIELAB units, more particularly preferably from 59.0 to 60.0 CIELAB units, and also an organic coating, preferably with oils, waxes, fatty acids or fatty acid salts, and/or an inorganic coating, preferably with inorganic salts such as carbonates, oxides or hydroxides of alkali and alkaline earth metals or of Mg, Zn, Al, La, Y, Zr, Sn and/or Ca or in each case not.

The iron oxide red pigments of the invention have, in a preferred embodiment, the $\alpha$-$FeO_3$ modification. In a further preferred embodiment, the iron oxide red pigments of the invention comprise a particle size of from 0.1 to 0.3 µm, and particular preference is given to at least 80% by weight of the iron oxide red pigments of the invention having a particle size of from 0.1 to 0.3 µm. In a further preferred embodiment, the iron oxide red pigments of the invention have an oil number of from 15 to 26, preferably from 15 to 24, measured in accordance with DIN EN ISO 787-5: 1995. In a further preferred embodiment, the Won oxide red pigments of the invention have a water content of 1.0% by weight or more, preferably from 1.0 to 5.0% by weight. The water is particularly preferably present as water of crystallization. In a further preferred embodiment, the iron oxide red pigments of the invention have a chloride content of from 0.001 to 0.1% by weight of chloride. For the purposes of the invention, the chloride content is the total content of chloride in the solid.

In a particularly preferred embodiment, the iron oxide red pigments of the invention have the hematite modification ($\alpha$-$Fe_2O_3$) and comprise a particle size of from 0.1 to 0.3 µm, with very particular preference being given to at least 80% by weight of the iron oxide red pigments of the invention having a particle size of from 0.1 to 0.3 µm, and have an oil number of from 17 to 26, preferably from 19 to 24, measured in accordance with DIN EN ISO 787-5: 1995, and have a water content of 1.0% by weight or more, preferably from 1.0 to 5.0% by weight.

In a preferred embodiment, the iron oxide red pigments of the invention additionally have a Newtonian flow behavior when they are present in the form of pastes, for example in the form of pigment universal pastes.

Newtonian flow behavior is defined by a particular dependence of the viscosity of the paste on the shear rate. The viscosity is defined as a measure of the viscous behavior of a fluid, for example a pigment paste, and has the unit Pa·s. The lower the viscosity, the thinner is the fluid. The shear rate is a concept from rheology, i.e. the study of deformation and flow behavior of material, and is defined as measure of the mechanical stress to which a sample is subjected in a rheological measurement. Shear rate is also referred to as shear gradient. The shear rate has the unit of the reciprocal of time, usually 1/s. In the case of fluids having ideal Newtonian flow behavior, their viscosity is independent of the shear rate at which the viscosity is measured. The viscosity of pigment pastes is, for the purposes of the invention, measured using a cone-and-plate viscometer (Rheo3000 from Brookfield Engineering Laboratories, Inc., USA) at shear rates of from 500/s to 2000/s. The criterion of Newtonian flow behavior is, according to the invention, satisfied when the viscosity at each measured value at shear rates of 500/s. 1000/s, 1500/s and 2000/s deviates by 10% or less, preferably by 5% or less, from the arithmetic mean of the measured values of shear rates of 500/s, 1000/s, 1500/s and 2000/s. II a measurement is at a shear rate, for example when the viscosity is greater than that of the maximum measurable viscosity, the criterion of Newtonian flow behavior is then likewise not satisfied according to the invention. The measurement of the viscosity at different shear rates is, according to the invention, carried out at 20° C. The pigment paste used for the measurement according to the invention is a conventional universal paste having the following composition in percent by weight:

| | |
|---|---|
| PEG 200 | 10.0 |
| Water | 14.7 |
| Byk 044 | 2.0 |
| Disperbyk 102 | 2.0 |
| Bentone SD 2 | 1.0 |
| Disperbyk 185 | 8.8 |
| Pigment | 61.5 |

The components used here are:
PEG 200: Polyethylene glycol 200, Merck KGaA, Germany
Byk 044: Silicone-containing antifoam for aqueous printing inks and overprinting varnishes from BYK Chemie GmbH, Germany
Disperbyk 102 Solvent-free wetting and dispersing additive from BYK Chemie GmbH, Germany
Bentone SD 2 Rheological additive from Elementis Specialities, USA
Disperbyk 185 Solvent-free wetting and dispersing additive from BYK Chemie GmbH, Germany The paste is produced by mixing all components with one another in a high-speed mixer at 4500 rpm for 30 minutes.

This test is, for the purposes of the invention, referred to as paste viscosity test.

In this embodiment, the iron oxide red pigments of the invention have a sum of the a* values in full shade and with reduction in surface coating testing of at least 58.0 CIELAB units, preferably more than 58.5 CIELAB units, particularly preferably more than 59.0 CIELAB units, and in the paste viscosity test have a Newtonian flow behavior, with the viscosity at each measured value at shear rates of 500/s, 1000/s, 1500/s and 2000/s deviating by 10% or less, preferably by 5% or less, from the arithmetic mean of the measured values of the shear rates of 500/s, 1000/s, 1500/s and 2000/s.

In a further embodiment, the iron oxide red pigments of the invention have a sum of the a* values in full shade and with reduction in surface coating testing of from 58.0 to 61.0 CIELAB units, preferably from 58.0 to 60.0 CIELAB units, more preferably from 58.5 to 61.0 CIELAB units, more preferably from 58.5 to 60.0 CIELAB units, particularly preferably from 59.0 to 61.0 CIELAB units, more particularly preferably from 59.0 to 60.0, and in the paste viscosity test have a Newtonian flow behavior, with the viscosity at each measured value at shear rates of 500/s, 1000/s, 1500/s and 2000/s deviating by 10% or less, preferably by 5% or less, from the arithmetic mean of the measured values of the shear rates of 500/s, 1000/s, 1500/s and 2000/s.

In a particularly preferred embodiment, the pigments of the invention have a sum of the a* values in full shade and with reduction in surface coating testing of at least 58.0 CIELAB units, preferably more than 58.5 CIELAB units, particularly preferably more than 59.0 CIELAB units, and in the paste viscosity test have viscosities at shear rates of 500/s, 1000/s, 1500/s and 2000/s of from 0.300 to 0.400 Pa·s.

In a further particularly preferred embodiment, the pigments of the invention have a sum of the a* values in full shade and with reduction in surface coating testing of from 58.0 to 61.0 CIELAB units, preferably from 58.0 to 60.0 CIELAB units, more preferably from 58.5 to 61.0 CIELAB units, more preferably from 58.5 to 60.0 CIELAB units, particularly preferably from 59.0 to 61.0 CIELAB units, more particularly preferably from 59.0 to 60.0, particularly preferably more than 59.0 CIELAB units, and in the paste viscosity test have viscosities at shear rates of 500/s, 1000/s, 1500/s and 2000/s of from 0.300 to 0.400 Pa·s.

The invention also provides a process for producing the iron oxide red pigments of the invention. The iron oxide red pigments of the invention are preferably produced by reaction of iron with an aqueous hematite nucleus suspension and an iron (II) salt solution, preferably iron (II) nitrate solution, in the presence of at least one oxygen-containing gas, namely the Penniman red process. In a further preferred embodiment, the iron oxide red pigments of the invention are produced by a process which excludes a calcination step at temperatures of greater than 600'C.

In a further embodiment, the process of the invention comprises at least the reaction of iron, hematite nucleus suspension containing hematite nuclei which have a particle size of 100 nm or less and a specific BET surface area of from 40 m$^2$/g to 150 m$^2$/g (measured in accordance with DIN 66131) and iron (II) nitrate solution in the presence of at least one oxygen-containing gas at temperatures of from 70 to 99° C., characterized in that the reaction takes place during introduction of an oxygen-containing gas in a pH range from pH 2.2 to pH 4.0, preferably from pH 2.2 to pH 3.0, producing a hematite pigment suspension.

In a preferred embodiment, the reaction takes place at least in the first 40 hours during the introduction of an oxygen-containing gas, preferably for more than 80% of the first 40 hours during the introduction of gas in a pH range from pH 2.2 to pH 4.0, preferably from pH 2.2 to pH 3.0.

Surprisingly, the pH of the reaction suspension can be regulated by introducing gaseous nitrogen in addition to the oxygen-containing gas into the reaction mixture, preferably into the liquid phase. This can be carried out either during the entire reaction time, for example with different volumes/hour of reaction time, or preferably only when the pH of the reaction mixture drops below 2.2. According to the invention, the gaseous nitrogen contains from 0 to 10% by volume of oxygen, preferably from 0 to 1% by volume of oxygen. According to the invention, the oxygen-containing gas contains from 15 to 100% by volume of oxygen. Preference is given to such an amount of gaseous nitrogen being introduced into the reaction mixture that the oxygen content based on the total volume of oxygen-containing gas and gaseous nitrogen is from 0 to 15% by volume, preferably from 0 to 10% by volume. Here, the introduction of the gaseous nitrogen can be carried out in such a way that the introduction of the oxygen-containing gas is either continued or interrupted but the sum of the volumes of oxygen-containing gas and gaseous nitrogen introduced is at least 1 m of gas volume/m$^3$ of batch volume/hour. The introduction of gaseous nitrogen into the reaction mixture results in the pH of the reaction mixture increasing so quickly that the pH of the reaction mixture can be kept within the range from pH 2.2 to pH 4.0, preferably from pH 2.2 to pH 3.0. The introduction of nitrogen is, according to the invention, stopped again after the upper pH limit of more than pH 4.0, preferably more than pH 3.0, has been reached and is recommenced only after the lower pH limit of less than pH 2.2 has been reached. FIG. 1 depicts a pH profile of a process according to the invention. The reaction time is shown on the x axis and the pH of the reaction mixture is shown on the y axis.

In contrast, reducing the volume of oxygen-containing gas introduced to below 0.2 gas volumes/m$^3$ of batch volume/hour without additional introduction of gaseous nitrogen leads only briefly to an increase in the pH but subsequently leads, within less than one hour, to a sharp decrease in the pH to pH 1.7 or less because of passivation of the iron present in the reaction mixture. Passivation of the iron is caused by formation of closed iron hydroxide and iron oxide deposits on the iron surface. The iron is thus completely coated on the surface by a closed iron oxide/iron hydroxide layer. This leads to undesirable premature cessation and thus to incomplete reaction.

Figure 2:
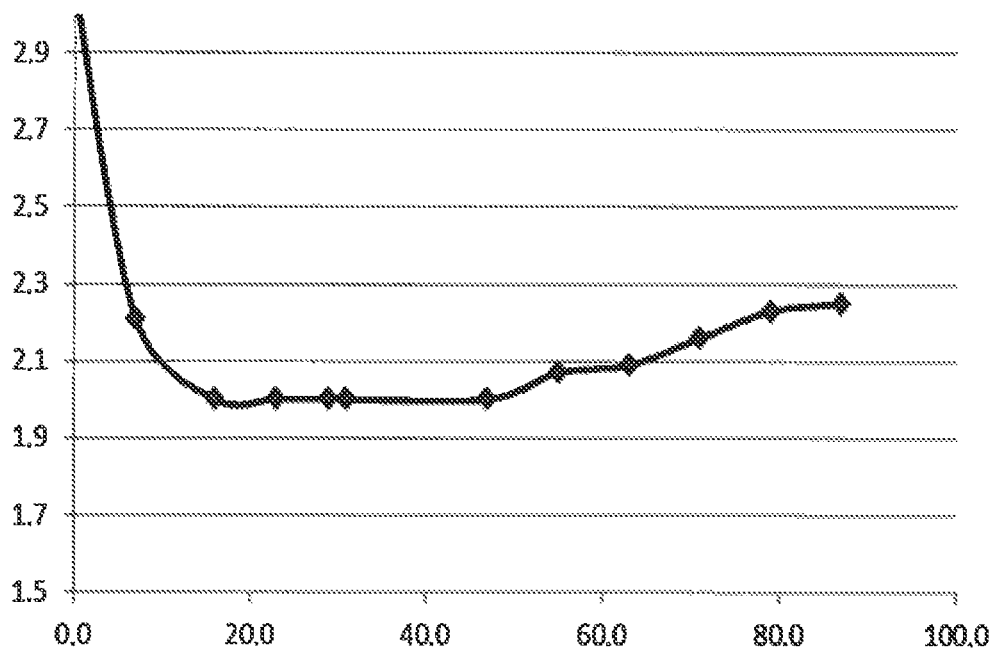

The pH profile of a typical reaction according to the Penniman red process according to the prior art is depicted in FIG. 2.

The reaction time is shown on the x axis and the pH of the reaction mixture is shown on the y axis. The pH of the reaction mixture is usually 2.5 or more and is defined by the mixing of the acidic iron (II) nitrate solution and the acidic hematite nucleus suspension. After commencement of introduction of gas at elevated temperatures, typically from 70 to 99° C., the pH drops within about 20 hours to below 2.1 and then increases again over a period of a further 40 hours to a pH of from 2.1 to 2.3. Reactions which have such a pH profile give hematite pigments which have a sum of the a* values in full shade and with reduction of 57.5 and less.

In one embodiment, the reaction is continued until the hematite pigment has the desired color shade in surface coating testing, i.e. has the appropriate a* values in full shade and with reduction. The a* values usually increase during the reaction in the presence of at least one oxygen-containing gas at temperatures of from 70 to 99° C. For this reason, samples are taken at different times during the reaction and analyzed by surface coating testing. A test in surface coating testing can usually be carried out within one hour. Within this time, the color values of the hematite in the reaction mixture can change again slightly. However, in the case of industrial production according to the process of the invention, which on the basis of experience proceeds very reproducibly, a person skilled in the art will be able to determine the optimal point in time for stopping the reaction.

In a further embodiment, the process of the invention comprises separating the hematite pigment from the hematite pigment suspension by conventional methods.

The reaction of iron, hematite nucleus suspension and iron (II) nitrate solution in the presence of at least one oxygen-containing gas at temperatures of from 70 to 99° C. is also referred to as pigment build-up.

The iron oxide red pigments produced by the process of the invention have the hematite modification ($\alpha$-Fe$_2$O$_3$) and are therefore also referred to as hematite pigments in the context of the present invention.

Figure 3:
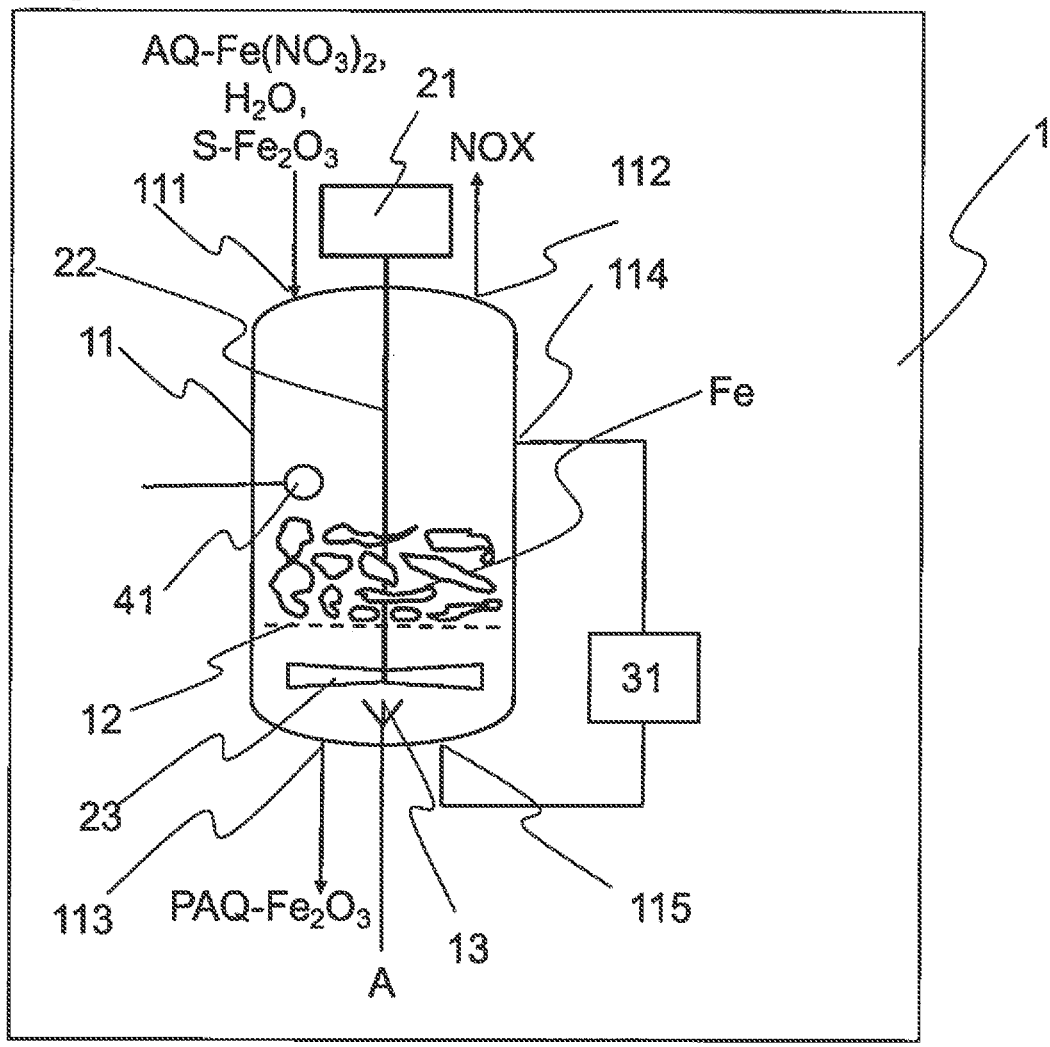

The pigment build-up according to the process of the invention is, in one embodiment, carried out in a reactor as shown in FIG. 3.

The invention further comprises apparatuses suitable for carrying out the process of the invention.

These are described in more detail below with the aid of FIG. 3.

FIG. 3 depicts an apparatus according to the invention.

In FIG. 3, the symbols have the following meanings:
A oxygen-containing gas
Fe iron
AQ-Fe(NO$_3$)$_2$ iron (II) nitrate solution
S—FeO$_3$ hematite nucleus suspension
PAQ-Fe$_3$O$_3$ hematite pigment suspension
H$_2$O water
NOX nitrogen oxide-containing stream (offgas from the production of the hematite pigment suspension)
1 reactor for producing hematite pigment suspension
11 reaction vessel
12 support for iron
13 gas introduction unit
111 inlet for iron (II) nitrate solution, hematite nucleus suspension
112 outlet for NOX
113 outlet for hematite pigment suspension
114 outlet for liquid phase
115 inlet for liquid phase
2 stirring device
21 drive
22 connection between drive and stirrer
23 stirrer
31 pump
41 pH electrode Reactor 1 typically comprises one or more reaction vessels made of materials which are resistant to the starting materials. Single reaction vessels can be, for example, brick-lined or tiled vessels let into the earth. The reactors also comprise, for example, vessels made of glass, nitric acid-resistant plastics such as polytetrafluoroethylene (PTFE), steel, e.g. enameled steel, plastic-coated or painted steel, stainless steel having the material number 1.44.01. The reaction vessels can be open or closed. In preferred embodiments of the invention, the reaction vessels are closed. The reaction vessels are typically designed for temperatures in the range from 0 to 150° C. and for pressures of from 0.05 MPa to 1.5 MPa. A preferred embodiment of a reactor 1 is shown in FIG. 3. Reactor 1 has at least reaction vessel 11, support 12 for Iron, gas introduction unit 13 for the at least one oxygen-containing gas A, inlet 111 for at least iron (II) nitrate solution and hematite nucleus suspension, outlet 112 for a nitrogen oxide-containing stream NOX, outlet 113 for the hematite pigment suspension, outlet for liquid phase 114, inlet for liquid phase 115, a stirring device 2 comprising a drive 21, a connection between drive and stirrer 22, a stirrer 23, a pump 31 and a pH electrode 41. Outlet 114, inlet 115 and pump 31 are connected to one another via a conduit in such a way that the liquid phase can be circulated from the reaction vessel 11 through the conduit and back Into the reaction vessel 11.

A further preferred embodiment of a reactor 1 has at least reaction vessel 11, support 12 for iron, gas introduction unit 13 for the at least one oxygen-containing gas A, inlet 111 for at least iron (II) nitrate solution and hematite nucleus suspension, outlet 112 for a nitrogen oxide-containing stream NOX, and outlet 113 for the hematite pigment suspension and optionally a pH electrode 41.

A further preferred embodiment of a reactor 1 has at least reaction vessel 11, support 12 for iron, gas introduction unit 13 for the at least one oxygen-containing gas A, inlet 111 for at least iron (II) nitrate solution and hematite nucleus suspension, outlet 112 for a nitrogen oxide-containing stream NOX, outlet 113 for the hematite pigment suspension, a stirring device 2 comprising a drive 21, a connection between drive and stirrer 22, a stirrer 23 and optionally a pH electrode 41.

A further preferred embodiment of a reactor 1 has at least reaction vessel 11, support 12 for iron, gas introduction unit 13 for the at least one oxygen-containing gas A, inlet 111 for at least iron (II) nitrate solution and hematite nucleus suspension, outlet 112 for a nitrogen oxide-containing stream NOX, outlet 113 for the hematite pigment suspension, outlet for liquid phase 114, inlet for liquid phase 115, a pump 31 and optionally a pH electrode 41.

The process of the invention is described in more detail below.

The figures describe:

FIG. 1: pH profile of a reaction according to the process of the invention. The time (h) is plotted on the x axis, and the pH of the reaction mixture is plotted on the y axis.

FIG. 2: pH profile of a nitrate process according to the prior art. The time (h) is plotted on the x axis, and the pH of the reaction mixture is plotted on the y axis.

FIG. 3: reactor 1 for carrying out the process of the invention

Figure 4:
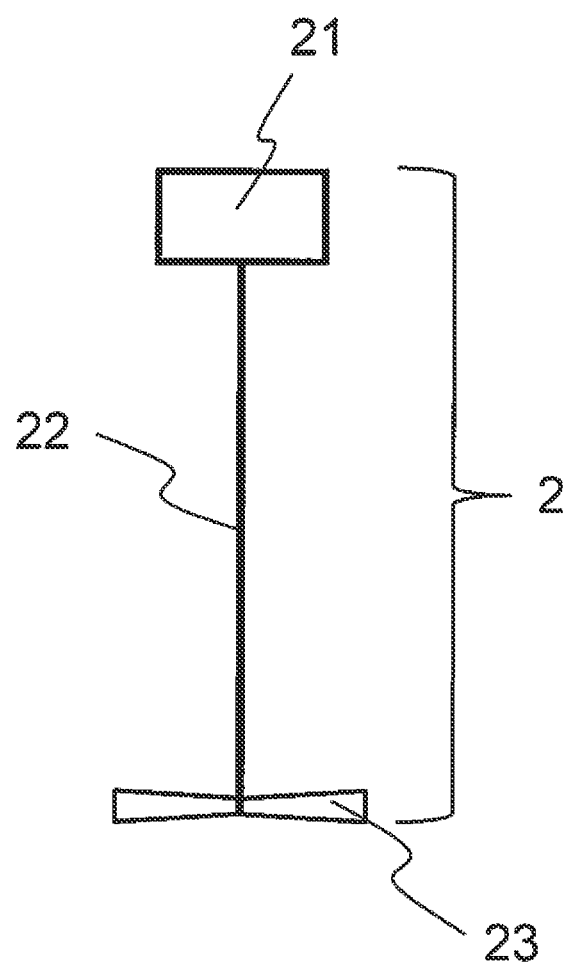

FIG. 4: stirring device 2

It may be pointed out at this juncture that the scope of the invention encompasses all desired and possible combinations of the general ranges or components, value ranges or process parameters specified in preferred ranges as mentioned above and in the following.

The aqueous hematite nucleus suspensions used in the process of the invention and the hematite nuclei present therein are known from the prior art. On this subject, reference is made to the description of the prior art. The hematite nuclei present in the water-containing hematite nucleus suspension comprise nuclei having a particle size of 100 nm or less and a specific BET surface area of from 40 m$^2$/g to 150 m$^2$/g, (measured in accordance with DIN 68131). The criterion of the particle size is satisfied when at least 90% of the hematite nuclei have a particle size of 100 nm or less, particularly preferably from 30 nm to 90 nm. The aqueous hematite nucleus suspensions used in the process of the invention typically comprise hematite nuclei having a round, oval or hexagonal particle shape. The finely divided hematite typically has a high purity. Foreign metals present in the iron scrap used for producing the hematite nucleus suspension are generally manganese, chromium, aluminum, copper, nickel, cobalt and/or titanium in a variety of concentrations, which can also be precipitated as oxides or oxihydroxides and incorporated into the finely divided hematite during the reaction with nitric acid. The hematite nuclei present in the water-containing hematite nucleus suspension typically have a manganese content of from 0.1 to 0.7% by weight, preferably from 0.4 to 0.6% by weight. Strongly colored red iron oxide pigments can be produced using nuclei of this quality.

The iron (II) nitrate solutions used in the process of the invention are known from the prior art. On this subject, reference is made to the description of the prior art. These iron (II) nitrate solutions typically have concentrations of from 50 to 150 g/l of Fe(NO$_3$) (reported as Fe(NO$_3$)$_2$ based on water-free matter). Apart from Fe(NO$_3$)$_2$, the iron (II) nitrate solutions can also contain amounts of from 0 to 50 g/l of Fe(NO$_3$)$_3$. However, very small amounts of Fe(NO$_3$)$_3$ are advantageous.

As iron, use is usually made in the process of the invention of iron in the form of wire, sheets, nails, granules or coarse turnings. The individual pieces can have any shape and usually have a thickness (e.g. measured as diameter of a wire or as thickness of a sheet) of from about 0.1 millimeters to about 10 mm. The size of wire bundles or of sheets used in the process usually depends on practicabilities. Thus, the reactor has to be able to be filled without difficulty with this starting material, which is generally effected through a manhole. Such iron is produced, inter alia, as scrap or as by-product in the metal processing industry, for example, stamping sheets.

The iron used in the process of the invention generally has an iron content of >90% by weight. Impurities present in this iron are usually foreign metals such as manganese, chromium, silicon, nickel, copper and other elements. However, iron having a higher purity can also be used without disadvantages. Iron is typically used in an amount of from 20 to 150 g/l based on the volume of the reaction mixture at the beginning of the reaction according to the invention. In a further preferred embodiment, the iron, preferably in the form of stamping sheets or wires, is distributed on the iron support over the area thereof with a preferred bulk density of less than 2000 kg/m$^3$ particularly preferably less than 1000 kg/m$^3$. The bulk density can, for example, be achieved by bending sheets of at least one iron grade and/or by targeted laying of the iron. This leads to typically more than 90% by volume of the oxygen-containing gas blown in under the iron support passing through the iron support without the oxygen-containing gas building up under the iron support.

The iron support, for example support 12, makes exchange of suspension and gas through openings present in the iron support possible. Typical embodiments of the iron support can be sieve trays, perforated trays or meshes. In one embodiment, the ratio of the cumulated area of openings to the total support area is from 0.1 to 0.9, preferably from 0.1 to 0.3. The holes or openings required for exchange of suspension are typically selected so that falling of the iron through the iron support is largely prevented. The iron support, for example support 12, can correspond to the diameter of the internal diameter of the reactor, for example the internal diameter of the reaction vessel 11, or be made smaller. In the latter case, a wall is preferably installed at the side of the iron support device so as to prevent iron from falling down. This wall can be permeable to the suspension, for example configured as mesh, or impermeable to the suspension and have, for example, the shape of a tube or a cuboid open at the top.

According to the invention, the total amount of iron in an amount of from 100 to 140% by weight, preferably from 100 to 120% by weight, of the amount of iron reacted in the reaction is initially charged for carrying out the process. The amount of iron reacted in the reaction is determined by difference weighing of the amount of iron before and after the reaction.

In one variant according to the prior art, a particular amount of iron is initially charged and further iron is then added in portions over the total reaction time, with a significant excess, typically from 150 to 200% by weight, of the total amount of iron reacted in the reaction being used. In this way, the pH of the reaction mixture can be increased, but an improvement in the color properties of the resulting pigments cannot be achieved.

In a preferred embodiment, low-salt water is used as water in the process for producing the hematite nucleus suspension and/or the iron (II) nitrate solution and/or the hematite pigment suspension. The conductivity can, as a simplification, be regarded as a measure of the salt burden. Low-salt water for the purposes of the invention has a conductivity of 20 µS/cm or less, preferably 10 µS/cm or less, particularly preferably 5 µS/cm or less. Polyvalent anions such as phosphate, silicate, sulfate and carbonate which are frequently present in process water can have a flocculating effect on the iron oxide pigments and lead to the iron oxide pigment flocculating even during the reaction and settling as sediment at the bottom of the reactor. To avoid this effect, low-salt water. e.g. deionized water (DI water), distilled water or water from reverse osmosis, is preferably used. Furthermore, the color values of the hematite pigments are thereby in a particularly preferred embodiment, low-salt water is used as water in the process for producing the hematite nucleus suspension and the iron (II) nitrate solution and the hematite pigment suspension. The color values of the pigments can again be improved thereby.

In the process of the invention, the reaction of at least iron, hematite nucleus suspension and iron (II) nitrate solution in the presence of at least one oxygen-containing gas is carried out at temperatures of from 70 to 99° C.

The at least one oxygen-containing gas is preferably selected from among air, oxygen, air heated to above ambient temperature or air enriched with steam.

In the process of the invention, the reaction of at least iron, hematite nucleus suspension and iron (II) nitrate solution is carried out with at least the liquid phase present during the reaction being mixed by means of mechanical and/or hydraulic mixing, or else not. Since suspended hematite is present in the liquid phase, the mechanical and/or hydraulic mixing is optionally preferably carried out in such a way that the hematite suspended in the liquid phase remains uniformly dispersed in the liquid phase and does not accumulate in the lower part of the liquid phase.

For the purposes of the present invention, mechanical mixing is mixing of the liquid phase by means of suitable devices. According to the invention, the liquid phase also contains solids suspended therein, for example the hematite nuclei or the hematite pigment and also further solids such as iron particles. Suitable devices for mechanical mixing encompass stirring devices, for example axial stirrers, radial stirrers and tangential stirrers. Stirring devices such as the stirring device 2 in FIG. 4 have at least one stirrer such as the stirrer 23 in FIG. 4, for example propellers, helices or blades which generate flow of the liquid phase. Stirring devices also typically have a drive such as the drive 21 in FIG. 4, e.g. a motor, and a connection between stirrer and drive 22, e.g. a shaft or magnetic coupling. Depending on the stirrer type, flows are generated in the radial direction, i.e. at right angles to the stirrer axis, or in the axial direction, i.e. parallel to the stirrer axis, or mixtures thereof. For example, blade stirrers preferably produce radial flows, Inclined blade stirrers and propeller stirrers produce axial flows. Axial flows can be directed upward or downward. For the purposes of the present invention, mechanical mixing of the liquid phase which Is directed axially from below upward onto the iron is preferred. This ensures that the liquid phase present in the voids between the iron pieces is also mixed with the liquid phase present outside the voids between the iron pieces. The at least one stirrer is preferably located below and/or above the Iron. Axial stirrers, particularly preferably inclined blade stirrers or propeller stirrers, are likewise preferred as stirrers.

In one embodiment, baffles are additionally present on the interior wall of the reaction vessel 1 in the case of radially acting stirrers. Corotation of the liquid phase and the resulting formation of vortices is thus avoided.

The degree of mechanical mixing is defined by the outer circumferential velocity of the stirrer, for example the stirrer 23. Preferred circumferential velocities are 0.5-15 m/s, measured at the circumference of the circle formed by the diameter of the stirrer. The power input into the liquid phase, which can be derived from the power uptake of the stirrer, is, according to the invention, from 0.1 to 5 kW per m$^3$ of batch volume, preferably 0.4 to 3 Kw per m$^3$ of batch volume. The ratio of stirrer diameter to the internal diameter of the reactor is preferably from 0.1 to 0.9. The power input into the liquid phase is given by the power uptake of the stirrer multiplied by the efficiency of the stirrer in percent. Typical efficiencies of stirrers used in the process of the invention are in the range from 70 to 90%. For the purposes of the invention, circumferential velocities of from 1 to 15 m/s and a power input of at least 0.4 kW/m$^3$ of batch volume are particularly preferred.

In a further embodiment, hydraulic mixing by means of a pump, for example pump 31, which takes the liquid phase from the reactor at an outlet, for example outlet 114, and feeds it back into the reactor again at a different place at an inlet, for example inlet 115, is carried out. Flows are produced at the inlet and outlet and also in the entire reaction mixture. Hydraulic mixing is carried out by means of a pump, for example pump 31, which takes the liquid phase from the reactor at an outlet, for example outlet 114, and feeds it back into the reactor again at a different place at an inlet, for example inlet 115. Flows are thus produced at the inlet and outlet and also in the entire reaction mixture. For the purposes of the invention, pumped circulation volumes of from 0.1 to 20 batch volumes/hour are preferred. For example, the pumped circulation volume at a batch volume of 30 m$^3$ and a value of 5 batch volumes/hour is 150 m$^3$/hour. In a further embodiment, preference is given to pumped circulation volumes which generate a flow velocity at the inlet, for example inlet 115, of at least 0.05 m/s, preferably at least from 0.06 to 15 m/s. Here, the flow velocity is measured at the inlet directly at the transition to the conduit from which the liquid phase circulated by pumping flows into the reaction mixture in the interior of the reactor. In a further embodiment, the flow is directed from the inlet, for example inlet 115, onto the iron support, for example iron support 12, preferably from below the iron support onto the iron support at a distance of less than 2 m, preferably less than 1 m. In a further embodiment, the inlet, for example inlet 115, is configured as a pipe or as a two-fluid sprayer or as nozzle.

In a preferred embodiment of the process of the invention, the reacting of at least iron, hematite nucleus suspension and iron (II) nitrate solution is carried out with introduction of at least one oxygen-containing gas at a gas introduction volume of 8 m$^3$ of gas volume/m$^3$ of batch volume/hour or less, preferably from 0.2 to 6 m$^3$ of gas volume/m$^3$ of batch volume/hour, particularly preferably from 0.2 to 5 m$^r$ of gas volume/m$^3$ of batch volume/hour, very particularly preferably from 0.2 to 3 m$^3$ of gas volume/m of batch volume/ hour.

In a further embodiment, the introduction of at least one oxygen-containing gas is carried out without mechanical mixing and without hydraulic mixing. In this case, only the introduction of oxygen-containing gas leads to strong mixing of the reaction mixture, for example at gas introduction volumes of from 7 to 10 m$^3$ per hour and m$^3$ of batch volume, as a result of which strong convection and strong bubble formation comparable to rigorous boiling of a liquid at the surface of the reaction mixture is generated in the reaction mixture.

According to the invention, the reaction mixture comprises all starting materials and the solid, liquid and gaseous products formed therefrom. A nitrogen oxide-containing stream NOX is also formed during the reaction. In a preferred embodiment, the nitrogen oxide-containing stream NOX is discharged from the reactor, for example via the outlet 112 of reactor 1. The batch volume is, according to the invention, defined as the total volume of the liquid and solid constituents of the reaction mixture which is present in the reaction vessel, for example in reactor 1, at a particular point in time during the reaction. The batch volume can, for example, be determined at any point in time during the reaction via a fill level indicator on the reactor in which the reaction is carried out.

The introduction of at least one oxygen-containing gas is preferably carried out by introducing the at least one oxygen-containing gas into the liquid phase of the reaction mixture underneath the iron support, for example support 12. The introduction of the gas is preferably carried out using a gas introduction unit, for example gas introduction unit 13, e.g. sparging ring, nozzles, (two-)fluid sprayers or a pipe ring provided with holes, which is located within the reaction mixture. For this purpose, the at least one oxygen-containing gas must have a sufficient pressure to counter the hydrostatic pressure of the liquid column of the reaction mixture. According to the invention, gaseous nitrogen is introduced, for example via the gas introduction unit 13 or another device, into the reaction mixture when the pH of the reaction mixture drops below 2.2. The introduction of gaseous nitrogen into the reaction mixture is stopped when the pH is again in the range from pH 2.2 to pH 4.0, preferably from pH 2.2 to pH 3.0. The pH of the reaction mixture can be determined by regular sampling of the reaction mixture or by means of a pH measuring probe, for example pH probe 41, located within the reaction vessel. The pH probe 41 is installed in such a way that it is completely immersed within the reaction mixture.

During the process of the invention, the pigment is bull up on the hematite nucleus present in the liquid phase, producing a hematite pigment suspension whose color values, preferably the a* and b* values thereof in surface coating testing, change during the reaction due to the changing particle size and/or morphology during pigment build-up. The point in time at which the process of the invention is stopped is determined by measuring the color values of the hematite pigment present in the hematite pigment suspension. The process of the invention is stopped when the hematite pigment has, in surface coating testing, the required sum of the a* values in full shade and with reduction in surface coating testing of at least 58.0 CIELAB units, preferably more than 58.5 CIELAB units, particularly preferably more than 59.0 CIELAB units. A comprehensive description of the surface coating testing carried out may be found in the section Examples and Methods. This is effected by stopping introduction of gas, optionally by simultaneous cooling of the reaction mixture to a temperature below 70° C. Typical reaction times for the reaction according to the invention are from 10 to 150 hours, depending on the desired color shade.

In a preferred embodiment, the hematite pigment is separated off from the hematite suspension by conventional methods, preferably by filtration and/or sedimentation and/ or centrifugation, after the reaction according to the invention. Washing of the filter cake obtained after the separation and subsequent drying of the filter cake are likewise preferably carried out. One or more sieving steps, particularly preferably using different mesh openings and with decreasing mesh openings, are likewise preferably carded out before separation of the hematite pigment from the hematite pigment suspension. This has the advantage that foreign bodies, for example metal pieces, are thereby separated off from the hematite pigment suspension; these would otherwise contaminate the hematite pigment.

The separation of the hematite pigment from the hematite pigment suspension can be carried out using all methods known to those skilled in the art, e.g. sedimentation with subsequent removal of the aqueous phase or filtration by means of filter presses, for example by means of membrane filter presses.

In a preferred embodiment of the process of the invention, at least one sulfate salt, for example iron (II) sulfate and/or an alkali metal or alkaline earth metal sulfate, preferably iron (II) sulfate and/or sodium sulfate, can be added to the hematite pigment suspension during or before sieving and/or during or before the pigment is separated off. This has the advantage that sedimentation of the hematite pigment from the hematite pigment suspension is accelerated. This makes the subsequent isolation of the hematite pigment easier.

Optionally, at least one washing of the sediment or filter cake separated off in this way is subsequently carried out. The separation and/or washing is optionally followed by drying of the resulting hematite pigment, for example using filter dryers, belt dryers, kneading dryers, spin-flash dryers, drying ovens or spray dryers. Drying is preferably carried out using belt dryers, plate dryers, kneading dryers and/or spray dryers.

Surprisingly, iron oxide red pigments which have a previously unattained color quality and also all further properties which are required for excellent coloring of media such as ceramics, building materials, plastics, paints, varnishes and paper are obtained by the process of the invention. The iron oxide red pigments of the invention additionally have a Newtonian flow behavior in a particular embodiment in the form of pigment pastes. This simplifies the processability of the pigments in paste and surface coating production. In addition, the iron oxide red pigments of the invention can be produced by a simpler process than the Copperas pigments which come closest to the color intensity of the pigments of the invention.

The invention also provides for the use of the iron oxide red pigment of the invention for coloring products of the paints, varnishes, coatings, building materials, plastics or paper industry, for coloring foodstuffs, baking enamels or coil coatings, sand granules, sand-lime bricks, enamels, ceramic glazes, asphalt or bark mulch, or for coloring products of the pharmaceutical industry, preferably tablets, or use as adsorbent, sensor, catalyst or use as component in batteries or accumulators, electrodes or use as raw material for producing other iron oxides or iron chemicals.

The invention also provides a method of coloring products of the paints, varnishes, coatings, building materials, plastics or paper industry, for coloring foodstuffs, baking enamels or coil coatings, sand granules, sand-lime bricks, enamels, ceramic glazes, asphalt or bark mulch, or coloring products of the pharmaceutical industry, preferably tablets, using the iron oxide red pigment of the invention, with coloring being carried out using methods known per se.

The invention also provides a product from the paints, varnishes, coatings, buildings materials, plastics or paper industry, from foodstuffs, baking enamels or coil coatings, sand granules, sand-lime bricks, enamels, ceramic glazes, asphalt or bark mulch, or from products of the pharmaceutical industry, preferably tablets, containing the iron oxide red pigment of the invention.

EXAMPLES AND METHODS

Titration of Iron (II) and Iron (III) Determination:

The content of iron (II) nitrate can be determined indirectly by measuring the iron (II) content by a potentiometric titration of a sample solution acidified with hydrochloric acid using cerium (III) sulfate.

pH Measurement:

pH measurements were carried out by means of a measuring instrument from Knick, Protos MS3400-160 using Knick, MemoSens, SE533X/2-NMSN. A calibration using buffer solutions of pH 4.65 and pH 9.23 was carried out (in accordance with DIN 19267) before the measurement. The pH measurement was carried out at 85° C. within the stirred reaction vessel.

Measurement of the Chloride Content:

The chloride content was determined by ion chromatography.

Iron Grades Used:

Iron stamping sheets having a thickness of 0.8 mm and containing less than or equal to 2500 ppm of manganese, less than or equal to 150 mg of chromium, less than or equal to 0.07% of carbon, less than or equal to 500 ppm of aluminum, less than or equal to 400 ppm of titanium and less than or equal to 250 ppm of copper were used.

DI Water (Deionized Water):

The low-salt water (DI water) used has a conductivity of 4 µS/cm. The ion concentration can be derived from the conductivity value. The measurement was carried out by means of an electrochemical resistance measurement using an instrument from WTW. As an alternative to DI water, it is also possible to use, for example, distilled water or purified water from a reverse osmosis plant, as long as the conductivity corresponds to the abovementioned specification.

Color Testing:

Testing of the color values in full shade and with reduction and also the color strength with reduction in a thixotropicized long-off alkyd resin (based on the methods of DIN EN ISO 11664-4.2011-07 and DIN EN ISO 787-25:2007). To test the color values of inorganic colored pigments, the pigment is dispersed in a binder paste based on a nondrying long-oil alkyd resin. The pigmented paste is painted into a paste plate and subsequently evaluated colorimetrically in comparison with the reference pigment.

1. Working Instruments

Plate color trituration machine (PCTM), plate diameter 240 mm*

Precision balance: Sensitivity 0.001 g (full shade)
      Sensitivity 0.0001 g (reduction)

Spectral color measuring instrument having the measuring geometry d/8°

Pallet knife having an elastic, highly polished blade (blade length about 100 mm, width about 20 mm) Paste plate and doctor blade based on DIN EN ISO 787-25:2007

2. Auxiliaries 2.1 Full Shade

The clear test paste (thixotropicized long-oil alkyd resin produced by a method based on DIN EN ISO 787-25:2007) contains 95% by weight of alkyd resin (WorléeKyd P151 from Worlée-Chemie GmbH, Germany) and as thixotropicizing agent 5% by weight of Luvotix HAT (Lehmann & Voss & Co. KG, Germany). Here, the Luvotix is stirred into the alkyd resin preheated to 70-75° C. and subsequently stirred at 95° C. until the entire thixotropiczing agent has dissolved. The cooled paste is finally rolled until free of bubbles on a three-roll mill.

2.2 Reduction

The white test paste (60% by weight of clear test paste+40% by weight of titanium dioxide (R-KB-2 from Sachtleben Pigment GmbH, Germany)

White spirit and cleaning cloth for cleaning the instruments (applicable to 2.1 and 2.2)

3. Procedure 3.1 Testing of the Color Values in Full Shade 5.00 g of the clear test paste are applied to the lower part of the plate color trituration machine (PCTM). 2.6 g of the pigment to be tested is premixed with the "clear test paste" on the lower plate of the color trituration machine outside the midpoint by means of the pallet knife without pressure until it is completely wetted. This mixture is subsequently dispersed using 3×25 revolutions. After each 25 revolutions, the material being milled is taken off from the upper plate by means of the pallet knife and again mixed with the material being milled on the lower plate and spread outside the midpoint. The color trituration machine is loaded with an additional weight of 2.5 kg on the front bracket during the total dispersing operation. The finished prepared paste is mixed by means of the pallet knife and transferred to a paste plate for measurement. For the measurement, the excess paste on the paste plate is struck off by means of a paste doctor blade under gentle pressure. After a rest time of one minute, the measurement of the color values is carried out immediately.

3.2 Testing of the Color Values with Reduction 5.00 g of the "white test paste" are introduced on the lower part of the color trituration machine (PCTM). 0.400 g of the pigment to be tested are weighed in so as to achieve a mass ratio of pigment to titanium dioxide of 1:5.

The respective pigment is premixed with the binder by means of the pallet knife without pressure on the lower plate of the color trituration machine outside the midpoint until it is completely wetted. This mixture is subsequently dispersed using 5×25 revolutions. After each 25 revolutions, the material being milled is, while the motor is running, taken off from the upper plate by means of the pallet knife and mixed again with the material being milled on the lower plate and spread outside the midpoint. The color trituration machine is loaded with an additional weight of 2.5 kg on the front bracket during the entire dispersing operation. The finished prepared paste is mixed by means of the pallet knife and transferred onto a paste plate for the measurement.

For the measurement, the excess paste on the paste plate is struck off under gentle pressure by means of a paste doctor blade. After a rest time of one minute, the measurement of the color values is carried out immediately.

Other dispersing apparatuses such as the Mikrodismembrator S (from Sartorius) or 2-planet centrifuge (dual axis centrifuge or vortex mixer) can be used when it is ensured by means of correlation checks that equivalent dispersing is effected with the settings and methods used.

4. Evaluation

The colorimetric evaluation is carried out according to the following standards:

DIN EN ISO 11664-4 (2011 July). Colorimetric determination of color numbers and color differences in the approximately uniform CIELAB color space DIN 5033 part 7 Color measurement, measurement conditions for body colors; light type C as defined under point 2.1.1; measuring geometry d/8 as defined under point 3.2.3

EN ISO 787-25: 2007 General test method for pigments and fillers—part 25: Comparison of the color on white, black and color pigments in full shade systems; colorimetric method (ISO 787-25:2007).

Production of the Hematite Nucleus Suspension

Production of Nuclei 37 kg of iron sheet having a thickness of about 1 mm were placed in a 1 m$^3$ reactor equipped with sieve tray (mesh opening about 10 mm), sparging ring (at the bottom of the reactor), pumped circulation and inclined blade stirrer. The sparging ring and the stirrer are installed underneath the sieve tray, the outlet of the pump circulation laterally at the iron bed and the intake of the pump circulation at the bottom of the reactor. The iron sheet was uniformly distributed over the sieve tray. 423 kg of DI water were subsequently introduced and stirred at 120 rpm (3.2 m/s, inclined blade stirrer, 50 cm diameter, the power input was 0.6 kW/m$^3$ of batch volume). The initial charge of iron was completely covered by the water. The mixture was heated to 90° C., and 97 kg of a 25% strength by weight nitric acid were subsequently metered in over a period of 60 minutes. The reaction was carried out until a pH of <2.0 was reached. Eight hours were required for this. The hematite nucleus suspension obtained was subsequently cooled to ambient temperature and dispensed into a container. The required amount of hematite nucleus concentrate was subsequently taken off after complete stirring up of the nuclei in the container and used for a Penniman build-up. The hematite nucleus concentration (as $Fe_2O_3$) was 130 g/l.

Production of the Iron (II) Nitrate Solution 62 kg of iron sheet having a thickness of about 1 mm were placed in a 1 m$^3$ reactor equipped with sieve tray (mesh opening about 10 mm), sparging ring (at the bottom of the reactor), pump circulation and inclined blade stirrer. The sparging ring and the stirrer are installed underneath the sieve tray, the outlet of the pump circulation laterally at the iron bed and the intake of the pump circulation at the bottom of the reactor. The iron sheet was uniformly distributed over the sieve tray. 423 kg of DI water were subsequently introduced and stirred at 120 rpm (3.2 m/s, inclined blade stirrer, 50 cm diameter, the power input was 0.6 kW/m$^3$ of batch volume). 277 kg of a 25% strength by weight nitric acid were metered in over a period of 200 minutes. The reaction was carried out until a pH of 5.0 was reached. 15 hours were required for this. The iron (II) nitrate solution obtained was subsequently cooled to ambient temperature and dispensed into a container. After a sedimentation time of 24 hours, the upper phase (clear phase) was separated off from the yellow/brown sediment and subsequently used in a Penniman build-up. The iron (II) nitrate concentration was 120 g/l.

Example 1

55 kg of iron sheet having a thickness of about 1 mm were placed in a 1 m$^3$ reactor equipped with sieve tray (mesh opening about 10 mm), sparging ring (at the bottom of the reactor), pumped circulation and inclined blade stirrer. The sparging ring and the stirrer are installed underneath the sieve tray, the outlet of the pump circulation laterally at the iron bed and the intake of the pump circulation at the bottom of the reactor. The iron sheet was uniformly distributed over the sieve tray. DI water and iron (II) nitrate are subsequently added in such amounts that a volume of 510 liters was obtained and the concentration of iron (II) nitrate (calculated as anhydrous iron nitrate) was 62 g/l. The mixture was mixed by means of a stirrer (80 rpm, 2.1 m/s, inclined blade stirrer, 50 cm diameter, the power input was 0.31 kW/m³ of batch volume) during the entire reaction time. One hour after addition of the iron (II) nitrate solution, 161 liters of hematite nucleus suspension having a concentration of 130 g/l (based on $Fe_2O_3$) were added and the mixture was heated to 85° C. After one hour at 85° C., sparging with 800 l/h of air was commenced. In addition, 2 m³/h of nitrogen ware introduced via a sparging ring when required in order to keep the reaction pH in the range 2.2-2.4 (switching on of nitrogen sparging and pH of 2.2 and switching off again at pH 2.4).

One liter in each case of samples of suspension were taken off at intervals of four hours during the reaction, and these were filtered off on a suction filter and washed with DI water. The washing operation was continued until the filtrate had a conductivity of <1000 μS/cm. The filter cake was subsequently dried at 80° C. to a residual moisture content of less than 5% by weight and the color in the surface coating system was determined (for a precise description of color testing, see methods). After the desired color space had been reached, the reaction mixture was admixed with iron (II) sulfate (29 liters containing 206 g/l of $FeSO_4$) and subsequently filtered on a filter press and the hematite pigment obtained was washed with DI water until the conductivity of the filtrate was <1000 μS/cm. The hematite pigment is subsequently dried at 80° C. to a residual moisture content of less than 5% by weight. The dried filter cake is subsequently mechanically comminuted by means of a shredder. The hematite pigment was in this way obtained in powder form in a yield of 81.0 kg. The total reaction time was 185 hours. Color testing was carried out in accordance with the above-described method description. The chloride content of the dried pigment was found to be 0.006% by weight. The viscosities in the paste viscosity test were: 0.358 Pa·s (at 500/s), 0.341 Pa·s (at 1000/s), 0.337 Pa·s (at 1500/s) and 0.344 Pa·s (at 2000/a).

Example 2 (Comparative Example)

55 kg of iron sheet having a thickness of about 1 mm were placed in a 1 m³ reactor equipped with sieve tray (mesh opening about 10 mm), sparging ring (at the bottom of the reactor), pump circulation and inclined blade stirrer. The sparging ring and the stirrer are installed underneath the sieve tray, the outlet of the pump circulation laterally at the iron bed and the intake of the pump circulation at the bottom of the reactor. The iron sheet Is uniformly distributed over the sieve tray. DI water and iron (II) nitrate are subsequently added in such amounts that a volume of 510 liters was obtained and the concentration of iron (II) nitrate (calculated as anhydrous Iron nitrate) was 62 g/l. The mixture was mixed by means of a stirrer (80 rpm, 2.1 m/s, Inclined blade stirrer, 50 cm diameter, the power input was 0.31 kW/m³ of batch volume) during the entire reaction time. One hour after addition of the iron (II) nitrate solution, 161 liters of hematite nucleus suspension having a concentration of 130 g/l (based on $Fe_2O$) were added and the mixture was heated to 85° C. After one hour at 85° C., sparging with 800 l/h of air was commenced. The reaction pH is shown in FIG. 2. One liter samples of suspension were taken at Intervals of four hours during the reaction and these were filtered off on a suction filter and washed with DI water. The washing operation was carried out until the filtrate had a conductivity of <1000 μS/cm. The filter cake was subsequently dried at 80° C. to a residual moisture content of less than 5% by weight and the color in the surface coating system was determined (for a precise description of color testing, see methods). After the desired color space had been reached, the reaction mixture was admixed with Iron (II) sulfate (29 liters containing 206 g/l of $FeSO_4$) and subsequently filtered on a filter press and the hematite pigment obtained was washed with DI water until the conductivity of the filtrate was <1000 μS/cm. The hematite pigment is subsequently dried at 80° C. to a residual moisture content of less than 5% by weight. The dried filter cake is subsequently mechanically comminuted by means of a shredder. The hematite pigment was in this way obtained in powder form in a yield of 76.0 kg. The total reaction time was 96 hours. In the surface coating testing, an a* value in full shade of 29.5 CIELAB units was measured and an a* of 25.1 CIELAB units was measured with reduction. The sum of the a* values is accordingly 54.6 CIELAB units. The surface coating testing was carried out according to the above-described method description.

TABLE 2

Color values of the examples in surface coating testing

| Example | a* full shade | b* full shade | C* full shade | a* reduction | b* reduction | C* reduction | Sum of a* full shade + a* reduction |
|---|---|---|---|---|---|---|---|
| 1 | 31.0 | 25.0 | 39.8 | 28.7 | 20.8 | 35.4 | 59.7 |
| 2 (for comparison) | 29.5 | 22.2 | 36.9 | 25.1 | 15.2 | 9.3 | 54.6 |

TABLE 3

Comparative values based on the internal reference standard of a pigment of the type R1599D

| Example | Δa* full shade | Δb* full shade | ΔC* full shade | Δa* reduction | Δb* reduction | ΔC* reduction | Sum of Δa* full shade + Δa* reduction |
|---|---|---|---|---|---|---|---|
| 1 | 0.5 | 0.2 | 0.5 | 1.5 | 2.0 | 2.3 | 2.0 |
| 2 (for comparison) | −1.0 | −2.6 | −2.4 | −2.1 | −3.6 | −3.8 | −3.1 |

What is claimed is:

1. A hematite pigment having a summed a* value (red-green value), sum of a* value in full shade and a* value with reduction in surface coating testing, of 58.0 to 61.0 CIELAB units and having a water content of 1.0% by weight or more.

2. The hematite pigment as claimed in claim 1, comprising an $\alpha$-$Fe_2O_3$ modification.

3. The hematite pigment as claimed in claim 1, comprising an organic coating and/or an inorganic coating.

4. The hematite pigment as claimed in claim 1, wherein the pigment does not have an organic coating or an inorganic coating.

5. The hematite pigment as claimed in claim 1, having a particle size of 0.1 to 0.3 µm.

6. The hematite pigment as claimed in claim 5, wherein at least 80% by weight of the hematite pigment has the particle size of 0.1 to 0.3 µm.

7. The hematite pigment as claimed in claim 1, having a Newtonian flow behavior in the paste viscosity test, with the viscosity at each measured value at shear rates of 500/s, 1000/s, 1500/s and 2000/s deviating by 10% or less from the arithmetic mean of the measured values at the shear rates of 500/s, 1000/s, 1500/s and 2000/s.

8. The hematite pigment as claimed in claim 1, having viscosities in the paste viscosity test at shear rates of 500/s, 1000/s, 1500/s and 2000/s of 0.300 to 0.400 Pa·s.

9. The hematite pigment as claimed in claim 1, wherein the pigment is produced by reaction of iron with an aqueous hematite nucleus suspension and an iron (II) salt solution, in the presence of at least one oxygen-containing gas.

10. A process for producing hematite pigments as claimed in claim 1, the process comprising:
contacting, in a reaction mixture:
iron,
hematite nucleus suspension containing hematite nuclei having a particle size of 100 nm or less and a specific BET surface area of 40 $m^2$/g to 150 $m^2$/g (measured in accordance with DIN 66131),
iron (II) nitrate solution, and
at least one oxygen-containing gas at a reaction mixture temperature of 70 to 99° C. and a pH of 2.2 to pH 4.0; and
maintaining the pH of the reaction mixture at 2.2 to 4.0 during the contacting, to produce a hematite pigment suspension.

11. The process for producing hematite pigments as claimed in claim 10, wherein:
reaction takes place at least in the first 40 hours during introduction of the oxygen-containing gas; and
the process further comprises drying of the hematite pigment and excludes calcination.

12. The process for producing hematite pigments as claimed in claim 10, wherein maintaining the pH comprises introducing a sufficient amount of gaseous nitrogen into the reaction mixture when the pH of the reaction mixture falls below 2.2 to return the pH of the reaction mixture to 2.2 to 4.0.

13. The process for producing hematite pigments as claimed in claim 12, wherein the oxygen-containing gas has an oxygen content of 15 to 100% by volume, and the gaseous nitrogen contains 0 to 10% by volume of oxygen.

14. The process for producing hematite pigments as claimed in claim 10, wherein the iron is in a mixture of iron and water, with the water having a conductivity of 20 µS/cm or less.

15. A method of coloring products with the hematite pigment of claim 1, the products comprising products of the paints, varnishes, coatings, building materials, plastics or paper industry, for coloring foodstuffs, baking enamels or coil coatings, sand granules, sand-lime bricks, enamels, ceramic glazes, asphalt or bark mulch, or for coloring products of the pharmaceutical industry, and the method comprising incorporating the hematite pigments into or onto the product.

16. A product from the paints, varnishes, coatings, building materials, plastics or paper industry, from foodstuffs, baking enamels or coil coatings, sand granules, sand-lime bricks, enamels, ceramic glazes, asphalt or bark mulch, or from products of the pharmaceutical industry, containing the hematite pigment as claimed in claim 1.

17. The hematite pigment as claimed in claim 1, wherein the summed a* value is 58.0 to 60.0 CIELAB units.

18. The hematite pigment as claimed in claim 1, wherein the summed a* value is 59.0 to 61.0 CIELAB units.

19. The hematite pigment as claimed in claim 1, wherein:
the summed a* value is 59.0 to 60.0 CIELAB units;
the pigment has an $\alpha$-$Fe_2O_3$ modification;
the pigment comprises at least one of:
no further coating;
an organic coating of oils, waxes, fatty acids or fatty acid salts, and
an inorganic coating of carbonates, oxides or hydroxides of alkali and alkaline earth metals or of Mg, Zn, Al, La, Y, Zr, Sn and/or Ca;
at least 80% by weight of the hematite pigment has a particle size of 0.1 to 0.3 µm;
the pigment has a water content of 1.0 wt % or more;
the pigment has a Newtonian flow behavior in the paste viscosity test, with the viscosity at each measured value at shear rates of 500/s, 1000/s, 1500/s and 2000/s deviating by 5% or less from the arithmetic mean of the measured values at the shear rates of 500/s, 1000/s, 1500/s and 2000/s; and
the pigment has viscosities in the paste viscosity test at shear rates of 500/s, 1000/s, 1500/s and 2000/s of 0.300 to 0.400 Pa·s.

* * * * *